United States Patent [19]

Öberg

[11] 4,166,712

[45] Sep. 4, 1979

[54] LIFT TRUCK WITH TILTABLE AND ROTATABLE LIFTING YOKE

[75] Inventor: Lars-Gunnar Öberg, Va Frölunda, Sweden

[73] Assignee: AB Bygg-och Transportekonomi (BT), Bromma, Sweden

[21] Appl. No.: 839,375

[22] Filed: Oct. 4, 1977

[30] Foreign Application Priority Data

Oct. 20, 1976 [SE] Sweden ............................... 7611623

[51] Int. Cl.² ............................................. B66C 23/00
[52] U.S. Cl. ................................... 414/732; 414/458; 414/680
[58] Field of Search ............. 214/1 D, 130 R, 131 R, 214/147 R, 149, 390, 394, 396, 77 R, 762, 658; 294/67 DA, 81 R, 81 SF

[56] References Cited

U.S. PATENT DOCUMENTS

| | | | |
|---|---|---|---|
| 2,727,639 | 12/1955 | Ball et al. | 214/149 X |
| 3,263,834 | 8/1966 | Tendresse | 214/147 R X |
| 3,606,046 | 9/1971 | Griesenbrock | 214/130 R |
| 4,049,143 | 9/1977 | Hataka et al. | 214/390 |
| 4,095,708 | 6/1978 | Gerhard | 214/313 |

FOREIGN PATENT DOCUMENTS 1067996 10/1959 Fed. Rep. of Germany ...... 214/147 G

*Primary Examiner*—L. J. Paperner
*Attorney, Agent, or Firm*—Flynn & Frishauf

[57] ABSTRACT

A lift truck comprising an open-frame carriage having at least two longitudinal frame girders, two lifting arms, each of which is pivotally mounted relative to its respective longitudinal frame girder for pivotal movement relative to its respective frame girder; and a lifting yoke turnably mounted between the two lifting arms and being further tiltable relative to the lifting arms, the lifting yoke being turnable, relative to the lifting arms through an angle of at least 90°, and preferably about 110°.

9 Claims, 4 Drawing Figures

LIFT TRUCK WITH TILTABLE AND ROTATABLE LIFTING YOKE

The present invention relates to lift trucks for handling big containers.

The existing types of lift trucks for handling goods at terminals are generally specially intended for a certain kind of goods. This also applies to lift trucks for containers. A consequence is that the capital investment in lifting devices and vehicles at a terminal, e.g. a sea port or a goods transport centre, is generally large.

The object of this invention is to develop a material handling vehicle which is simple in construction, and which at the same time offers an opportunity of quick and "flexible" handling of big-load containers, varying in size and containing very different kinds of goods.

SUMMARY OF THE INVENTION

According to the invention, a lift truck device comprises an open-frame carriage with two longitudinal frame girders, a lifting arm being vertically pivoted relative to the frame girders. The invention is characterized in that between the two lifting arms a lifting yoke is suspended, the lifting yoke being tiltable forward or backward in the longitudinal direction of the truck, and turnable through an angle of more than 90°, preferably 110°. By this arrangement an open-frame carriage can be used not only for lifting, moving, and lowering big-load containers, but also for turning them, for instance in order to put them down on a base in a changed angular position, or for tilting and emptying a bulk goods container.

BRIEF DESCRIPTION OF THE DRAWINGS

FIG. 4 shows the cross girder of the device in a front elevation, on a larger scale.

DETAILED DESCRIPTION

Figure 1:
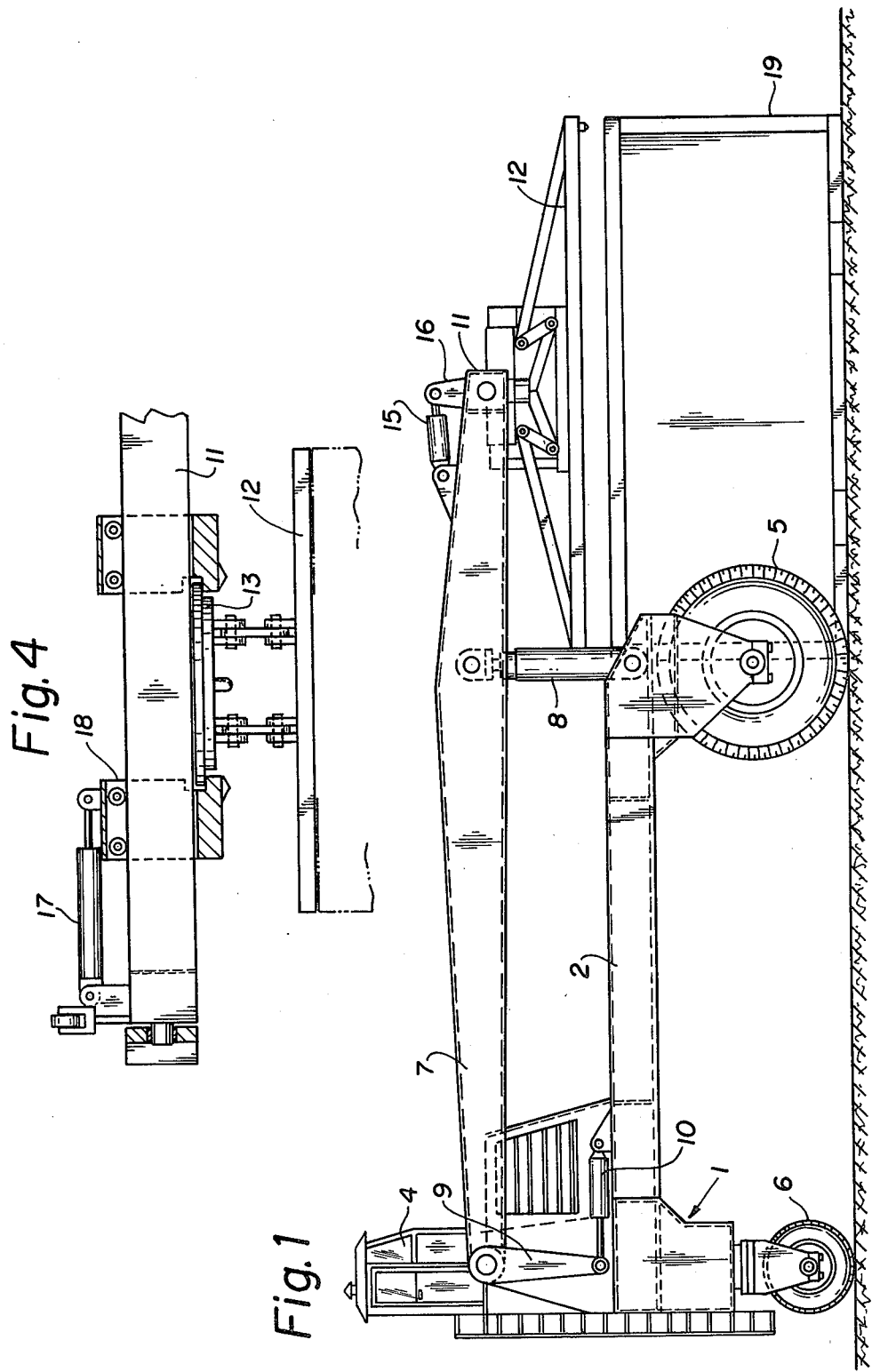
FIG. 1 is a side elevation of a lift truck according to the invention, with its lifting arms lowered.
Figure 2:
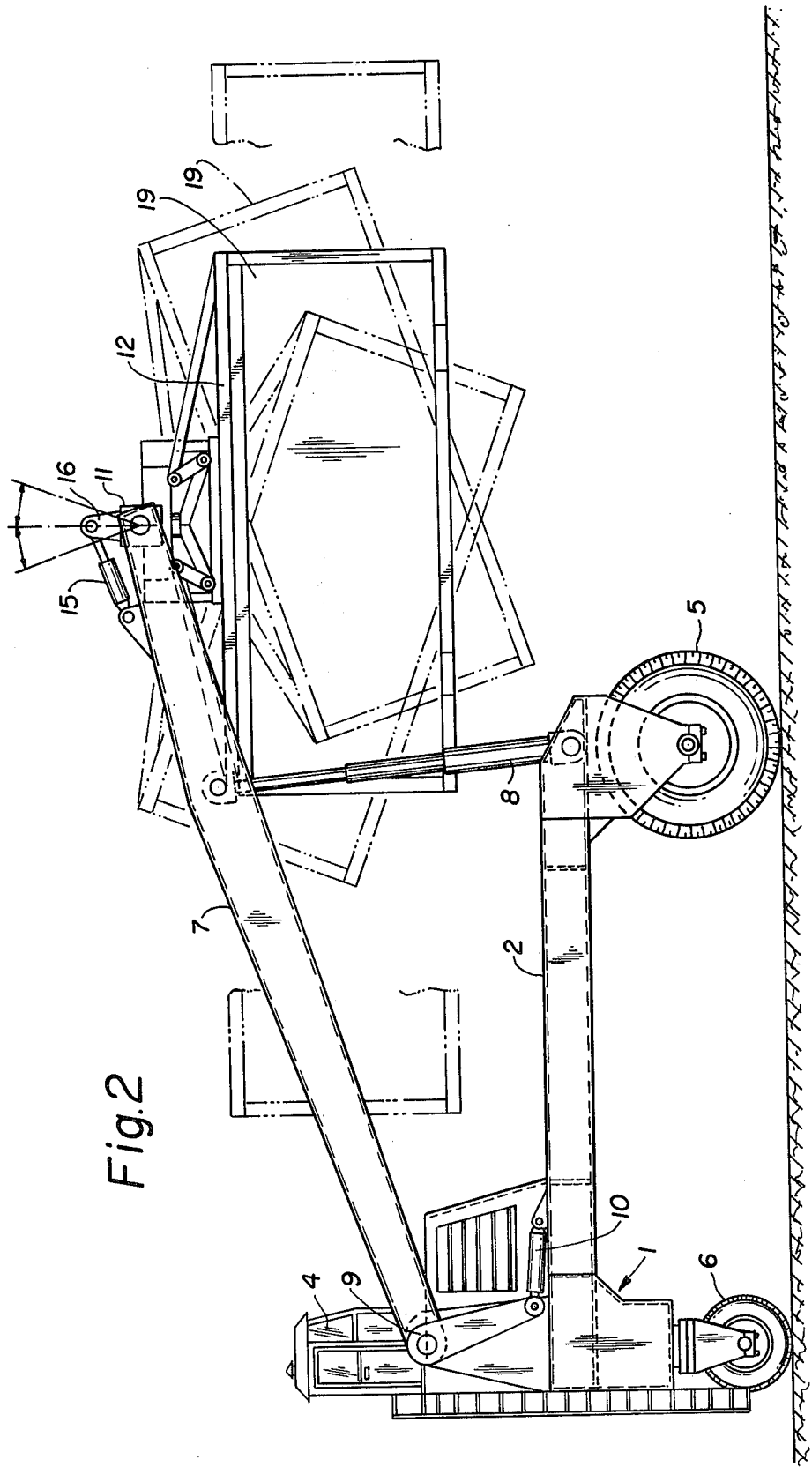
FIG. 2 is a similar elevation as in FIG. 1 but with the lifting arms in a lifting position.
Figure 3:
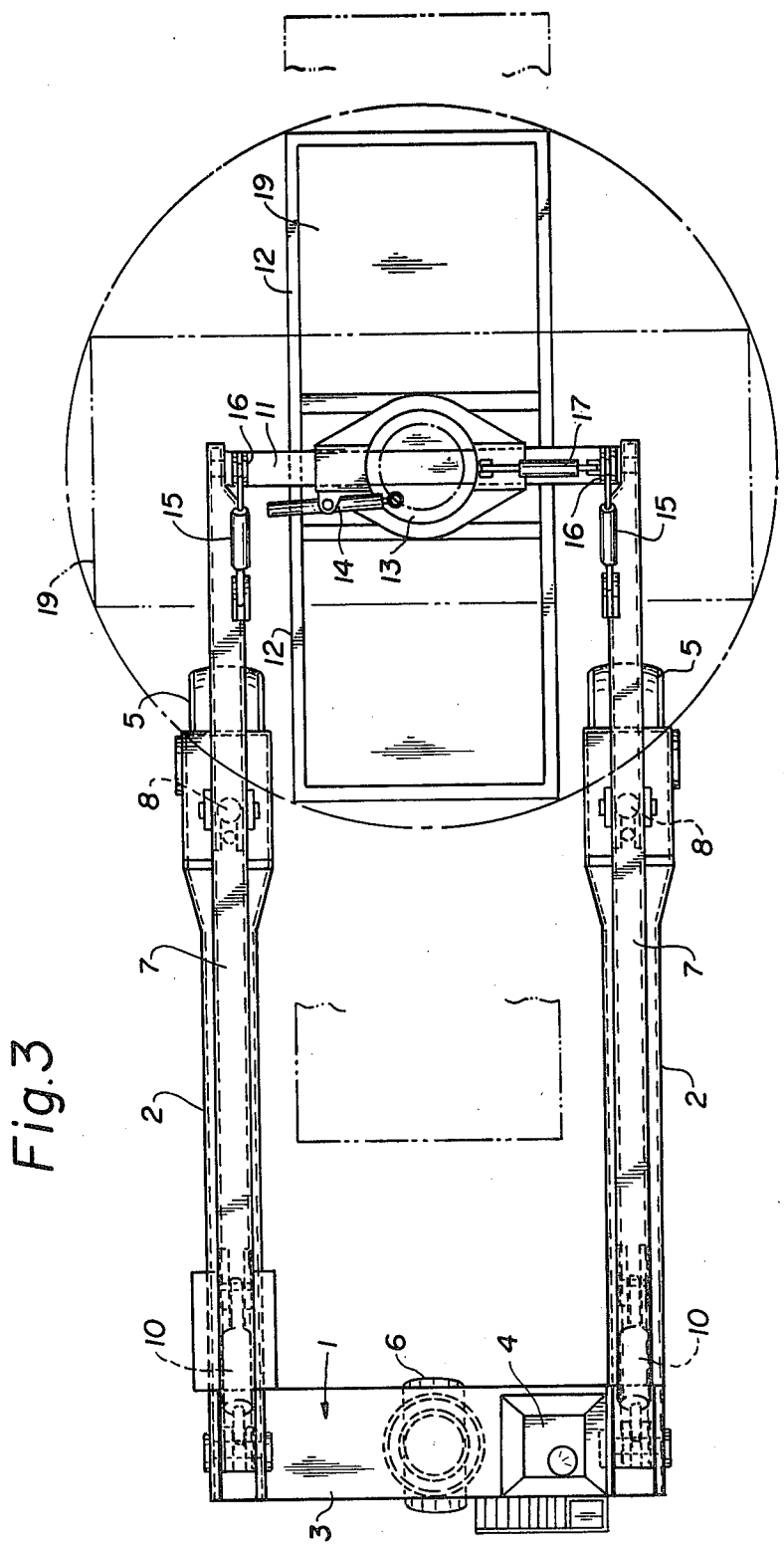
FIG. 3 is a top plan view of the lift truck of FIG. 1.

Referring to FIGS. 1-3, the lift truck of the present invention is of the so-called straddle truck type, and comprises an open-frame carriage 1, with two longitudinal frame girders 2 and a transversal joining section 3 (FIG. 3), on which the operator's cabin 4 is mounted. The truck is a three-wheel vehicle, two of the wheels 5 driving, one under each of the longitudinal frame girders 2, and a steering wheel 6 under the joining section 3.

Above of each frame girder 2 there is a pivotally mounted lifting arm 7. The lifting arms 7 are pivoted in bearings at the ends of the joining section 3 and are movable up and down, each arm by means of a separate multi-stage piston cylinder 8. Through a link arm 9 each lifting arm 7 is connected with a piston cylinder 10 mounted on the respective frame girder 2. The function of the cylinder 10 will be described below.

Between the free ends of the two lifting arms 7 there is a cross girder 11, from which a lifting yoke 12 is suspended. According to the invention lifting yoke 12 is turnable more than 90°, preferably 110°, as well as tiltable forward-backward in the longitudinal direction of the truck. For the first-mentioned function the cross girder 11 is provided with a rotary support disc 13, as best seen in FIGS. 3 and 4, from which the lifting yoke 12 is suspended. In the embodiment shown there is also arranged a piston cylinder 14, as seen in FIG. 3, which is connected with the rotary support disc 13. By means of the said piston cylinder 14 the lifting yoke 12, mentioned above, is turnable somewhat more than a quarter of a turn.

For tilting the lifting yoke 12 there is on each of the lifting arms 7 arranged a piston cylinder 15, which is connected with a lever-forming projection 16 at the respective ends of the gross girder 11, which is pivoted in bearings at the ends of the two lifting arms 7.

As can be best seen from FIG. 4, the rotary support disc 13 is suitably arranged in a travelling crab 18, displacable along the cross girder 11 by means of a further piston cylinder 17. This equipment makes the lifting yoke 12 laterally adjustable.

As an illustrative example, handling of a 20 foot container 19 will be described. FIG. 1 shows the straddle truck of the present invention in a position, where one frame girder 2 is located at each side of the big-load container 19, and the lifting yoke 12 is adjusted in position to clutch or engage the corners of the container 19. By virtue of the practical construction of the truck, the loading operation can easily be supervised from the cabin 4. The handling can be still more facilitated if the cabin 4 is made displacable forward along one of the frame girders 2.

After having been lifted to the position shown in FIG. 2, the big-load container 19 can be moved and, for instance, stacked on top of another similar container or be put on a vehicle platform and transported out of the terminal. If the contents of the big-load container 19 are supposed to be some kind of bulk goods, the device according to the invention can be used for tilting the container—after its end door has been opened—forward or backward, as shown by the dashed/dotted lines in FIG. 2, in order to quickly empty the container.

The lift truck device according to the invention can drive up to a long side of a big-load container 19, lift the container and turn it a quarter of a revolution before it is put down, or—inversely—the truck can drive up to a short side of a big-load container 19 and put the container down transversely. This capacity strongly contributes to the great flexibility of the lift truck. By virtue of its relatively simple construction the lift truck is simple and handy to operate. Both the lifting arms 7 as well as the multi-stage piston cylinders 8 are, however, strongly dimensioned to permit even the lifting of heavy objects. As is indicated by the dashed/dotted lines in FIG. 2, the lift truck is capable of lifting and transporting even 40 foot long containers.

The flexibility of the lift truck makes the handling swifter than what is possible when using the earlier known, clumsier lift trucks. The piston cylinders 10 contribute to the swiftness of operation. By means of cylinders 10 the lifting arms 7 can be lowered from the position shown in FIG. 2 to the position in shown FIG. 1 faster than if the lifting arms 7 fall by their own weight only.

The invention is not confined to the construction example shown and described here, but can be varied in a multiple of ways within the scope of the claims. The mechanism, which turns the lifting yoke 12, can, for instance, be replaced by a gear ring and an electric motor with a worm gear.

The lift truck can be developed into a four-wheel construction, wherein the handling technique of the high-lifting straddle truck can be duplicated.

I claim:

1. A lift truck for handling containers comprising:
   a carriage (1) having a generally U-shaped frame, said frame including two laterally spaced longitudinal frame girders (2) and means (3) extending transversely of said frame girders (2) and interconnecting said frame girders (2) only at one end portion thereof, said frame girders (2) being free of transversely extending means between said one end portion thereof and the other end thereof;
   two laterally spaced lifting arms (7), each of which is pivotally mounted relative to a respective longitudinal frame girder (2) in the vicinity of the ends of said respective frame girders (2) which are interconnected by said transverse interconnecting means (3) for vertical pivotal movement of said lifting arms (7) relative to their respective frame girder (2);
   a cross girder (11) tiltably mounted to said lifting arms (7) in the vicinity of the ends of said lifting arms (7) which are remote from said transverse interconnecting means (3);
   a lifting yoke (12) rotatably mounted to said cross girder (11) between said two lifting arms (7), said lifting yoke (12) being further tiltable forward and backward relative to said lifting arms (7) in the longitudinal direction of said lifting arms (7) and independently of the position of said lifting arms (7), said lifting yoke (12) being rotatable relative to said lifting arms (7) through an angle of at least 90°;
   means coupled between said cross girder (11) and at least one of said lifting arms (7) for tilting said cross girder (11), and for consequently tilting said lifting yoke (12), relative to said lifting arms (7); and
   turning means (14) coupled to said lifting yoke (12) for causing said lifting yoke (12) to rotate relative to said lifting arms (7).

2. Lift truck according to claim 1 wherein said cross girder (11) is tiltably mounted to said lifting arms (7) at the ends of said lifting arms remote from the pivotal mounting of said lifting arms to said longitudinal frame girders (2); and comprising a piston-cylinder arrangement (15) coupled between said cross girder (11) and both of said lifting arms (7) for tilting said cross girder (11) relative to said lifting arms (7).

3. Lift truck according to claim 2 further comprising a projection (16) extending from said cross girder (11) and coupled to said piston-cylinder arrangement (15).

4. Lift truck according to claim 1 wherein said cross girder (11) includes a rotary support means (13) to which said lifting yoke (12) is mounted; and said turning means (14) is coupled to said rotary support means (13) for turning said rotary support means (13), and consequently said lifting yoke (12), relative to said cross girder (11).

5. Lift truck according to claim 4 comprising slide means (18) slidably mounted on said cross girder (11), said rotary support means (13) being rotatably mounted to said slide means (18); and wherein said turning means comprises a piston cylinder arrangement (14) coupled between said slide means (18) and said rotary support means (13).

6. Lift truck according to claim 1 comprising lifting means (8) coupled to said lifting arms (7) for vertically pivoting said lifting arms relative to said longitudinal frame girders (2), thereby raising said lifting yoke (12).

7. Lift truck according to claim 6 wherein said lifting means (8) comprises relative lifting piston cylinder arrangements (8) coupled between respective lifting arms and longitudinal frame girders.

8. Lift truck according to claim 1 further comprising displacing means (17,18) for mounting said lifting yoke (12) to said girder (11) such that said lifting yoke (12) is displaceable relative to said girder (11) in the longitudinal direction of said cross girder (11).

9. Lift truck according to claim 8 wherein said displacing means comprises means (18) slidable on said cross girder (11) and to which said lifting yoke is rotatably mounted; and a displacing piston cylinder arrangement (17) coupled between said slidable means (18) and said cross girder (11).

* * * * *